(12) United States Patent
Ott et al.

(10) Patent No.: US 12,535,574 B2
(45) Date of Patent: Jan. 27, 2026

(54) RADAR DEVICE AND METHOD OF OPERATING A RADAR DEVICE

(71) Applicant: Infineon Technologies AG, Neubiberg (DE)

(72) Inventors: Julius Ott, Hohenschäftlarn (DE); Avik Santra, Irvine, CA (US); Lorenzo Servadei, Munich (DE)

(73) Assignees: INFINEON TECHNOLOGIES AG, Neubiberg (DE); INFINEON TECHNOLOGIES AMERICAS CORP., El Segundo, CA (US)

( * ) Notice: Subject to any disclaimer, the term of this patent is extended or adjusted under 35 U.S.C. 154(b) by 287 days.

(21) Appl. No.: 18/334,013

(22) Filed: Jun. 13, 2023

(65) Prior Publication Data

US 2024/0004055 A1  Jan. 4, 2024

(30) Foreign Application Priority Data

Jul. 1, 2022  (EP) .................................... 22182491

(51) Int. Cl.
*G01S 13/58*  (2006.01)
*G01S 7/41*  (2006.01)

(52) U.S. Cl.
CPC ............ *G01S 13/581* (2013.01); *G01S 7/417* (2013.01)

(58) Field of Classification Search
CPC ................................ G01S 13/581; G01S 7/417
See application file for complete search history.

(56) References Cited

U.S. PATENT DOCUMENTS

2022/0091259 A1\*  3/2022  Hucks ........................ G06T 1/20
2022/0138568 A1\*  5/2022  Smolyanskiy ......... G06N 3/044
    706/21
2022/0355824 A1\*  11/2022  Goyal ...................... G06N 3/08

FOREIGN PATENT DOCUMENTS

EP    3971603 A1    3/2022

OTHER PUBLICATIONS

Hochreiter, Sepp et al., "Learning to Learn Using Gradient Descent", International Conference on Artificial Neural Networks. Springer, Berlin, Heidelberg, Jan. 1, 2001, pp. 87-94.
Rakelly, K., et al., "Efficient Off-Policy Meta-Reinforcement Learning via Probabilistic Context Variables", arXiv:1903.08254v1, Mar. 19, 2019, 11 pages.

\* cited by examiner

*Primary Examiner* — Vladimir Magloire
*Assistant Examiner* — Nazra Nur Waheed
(74) *Attorney, Agent, or Firm* — SLATER MATSIL, LLP

(57) ABSTRACT

A radar device includes a radar front end configured to send radar signals and to receive reflected radar signals, processing circuitry configured to provide digital radar data based on the received reflected radar signals, and a digital filter configured to process the digital radar data to obtain information about objects which reflected the radar signals. The device further comprises machine learning logic with a policy network configured to set the parameters of the digital filter based on the digital radar data, and a reward value generating network including a plurality of heads, each head configured to provide a respective expected reward value for a setting of parameters by the policy network. The radar device is further configured to detect that a scene captured by the radar device is not reliably processable based on a distribution of the expected reward values generated by the plurality of heads.

20 Claims, 11 Drawing Sheets

RADAR DEVICE AND METHOD OF OPERATING A RADAR DEVICE

This application claims the benefit of European Patent Application No. 22182491, filed on Jul. 1, 2022, which application is hereby incorporated herein by reference.

TECHNICAL FIELD

The present application relates to radar devices and to methods of operating radar devices. Furthermore, the present application relates to training methods for training a machine learning logic used in such a radar device.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at e.g., 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining the distance based on a time delay and/or frequency difference between the transmission and reception of the frequency modulated signal. Accordingly, some radar systems include a transmit antenna to transmit the radio-frequency (RF) signal, and a receive antenna to receive the reflected RF signal, as well as the associated RF circuits used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

Besides determining only the distance to a target, tracking of detected targets is desirable in many applications, for example to determine how a target moves from radar frame to radar frame. While this is comparatively straight forward in case a single target is present, for example a single person, it may become a greater challenge in case of multiple targets, for example multiple persons in a scene.

One approach used for tracking uses a digital filtering of the acquired radar data, for example using a extended or unscented Kalman filter. A Kalman filter or other digital filter may perform the tracking based on various parameters.

SUMMARY

A radar device as defined in claim 1 and a method as defined in claim 9 are provided. The dependent claims define further embodiments.

According to an embodiment, a radar device is provided, comprising:
- a radar front end configured to send radar signals and to receive reflected radar signals;
- processing circuitry configured to provide digital radar data based on the received reflected radar signals,
- a digital filter configured to process the digital radar data in order to obtain information about objects which reflected the radar signals; and
- a machine learning logic, comprising:
  - a policy network configured to set the parameters of the digital filter based on the digital radar data, and
  - a reward value generating network including a plurality of heads, each head configured to provide a respective expected reward value for a setting of parameters by the policy network,
- wherein the radar device is further configured to detect that a scene captured by the radar device is not reliably processable based on a distribution of the expected reward values generated by the plurality of heads.

According to another embodiment, a method is provided, comprising:
- transmitting radar signals and receiving reflected radar signals;
- providing digital radar data based on the received reflected radar signals;
- digitally filtering the digital radar data in order to obtain information about objects which reflected the radar signals;
- by a policy network of a machine learning logic, setting parameters of the digital filter based on the digital radar data;
- by a reward value generating network of the machine learning logic including a plurality of heads, providing a respective expected reward value for each of the plurality of heads for a setting of parameters by the policy network; and
- detecting that a scene captured is not reliably processable based on a distribution of the expected reward values generated by the plurality of heads.

The above summary is merely intended to give a brief overview over some embodiments and is not to be construed as limiting, as other embodiments may include different features from the ones discussed above.

DETAILED DESCRIPTION OF ILLUSTRATIVE EMBODIMENTS

In the following, various embodiments will be described in detail referring to the attached drawings. These embodiments are given by way of example only and are not to be construed as limiting any way. For example, while embodiments are described including a plurality of features (for example components, elements, acts, events, steps or the like), in other embodiments some of these features may be omitted, or may be replaced by alternative features. Furthermore, in addition to the features explicitly described, other features may be provided, for example features used in conventional radar devices and associated methods.

Details or variations described with respect to one of the embodiments may also be applied to other embodiments and therefore will not be described repeatedly. Features from different embodiments may be combined to form further embodiments.

Figure 1:
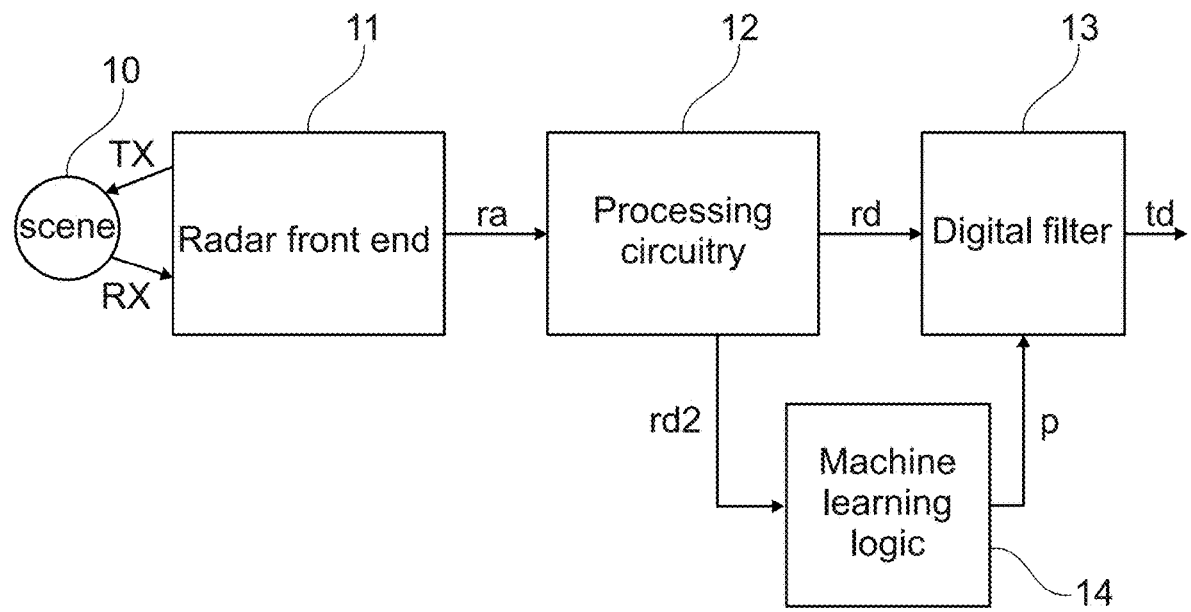
FIG. 1 is a block diagram illustrating a radar device according to an embodiment.

Turning now to the Figures, FIG. 1 is a block diagram of a radar device according to an embodiment. The radar device of FIG. 1 includes a radar front end 11 which transmits radar signals (TX) towards a scene 10 and receives reflected radar signals (RX) from scene 10, for example reflected from objects like persons. Radar front end 11 processes the received radar signals. Such a processing may for example include mixing and the like. Radar front end 11 may be implemented in any conventional manner known to the skilled person. A particular implementation will be discussed further below referring to FIGS. 4 to 6.

Radar front end outputs analog radar signals ra to processing circuitry 12. Processing circuitry 12 further processes and digitizes the radar signals and outputs digital radar data rd, for example so called radar images. Digital radar data rd is provided to a digital filter 13 in order to obtain information about objects in scene 10, said information labelled td in FIG. 1. For example, information td may be tracking information about objects like persons. Digital filter 13 may be an extended or unscented Kalman filter. Apart from the digital filtering, further conventional processing may be applied to obtain information td.

Digital filter 13 may perform the filtering based on various parameters, also referred to as hyperparameters herein. For example, such parameters may be parameters of the state transition model or a control input model used by the Kalman filter. Other hyperparameters include process angle variance or measurement noise. In a particular example, digital filter 13 is a tracking filter and may use about 14 adjustable tracking-parameters. These may include for example six parameters for noise measurement/measuring noise, five parameters for processing noise, two parameters for opening and deleting tracks and, finally, a Mahalanobis distance-based gating parameter that decides if a measurement is associated with any track. In summary, the hyperparameters describe and model the scene, where the tracker is performing the location of the target.

The optimum parameters for processing radar signals obtained from scene 10 depend on the scene and the environment. For example, the optimum parameters may depend on a number of objects, for example a number of people to track, noise, false tracking targets, movement of the target, and the general environment of the objects to be tracked. Optimized parameters for a particular scene tend to give better results than general parameters.

Therefore, in the radar device of FIG. 1, a machine learning logic 14 sets the parameters p of digital filer 13 based on digital radar data rd2 which may be the same as digital radar data rd, and/or may include data in another stage of the processing pipeline processing the received radar signals.

A machine learning logic, as used herein, refers to an entity using approaches that learn based on training data or other data to improve its performance. Common types of machine learning logic include artificial neural networks, decision trees, support vector machines and the like. In embodiments, a machine learning logic is used which includes at least a policy network, which provides the parameters p based on data rd2, and a critic network which provides at least one reward value, also referred to as Q-Value, for the choices the policy network makes. An example embodiment of such a machine learning logic is illustrated in FIG. 2.

Figure 2:
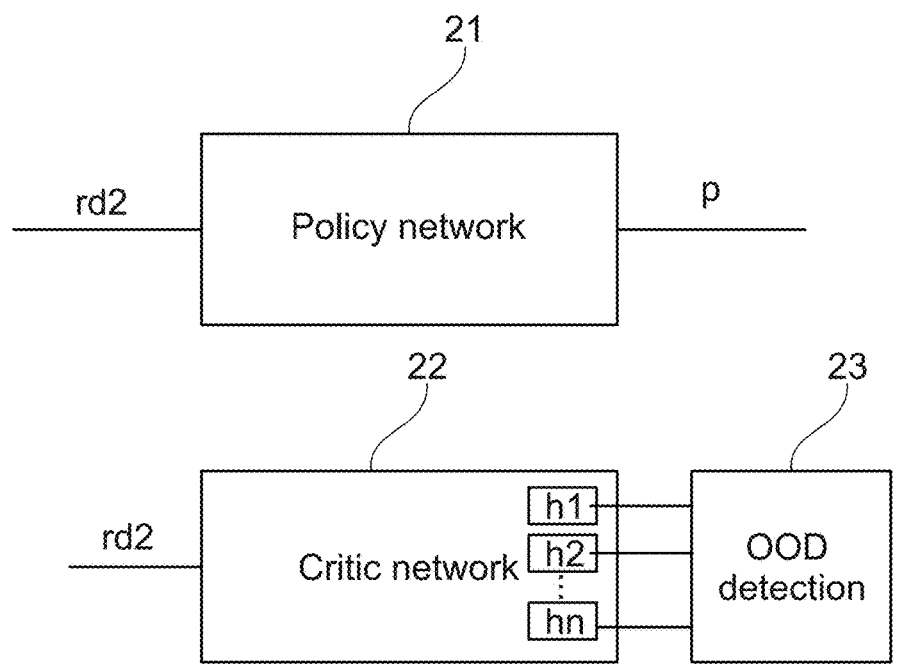
FIG. 2 is a block diagram illustrating a machine learning logic according to an embodiment.

As shown in FIG. 2, in an embodiment the machine learning logic includes a policy network 21 and a critic network 22. A policy network is sometimes also referred to as actor network herein. Policy network 21 and critic network 22 may both be implemented as artificial neural networks, for example convolutional neural networks (CNN), including a plurality of layers. Policy network 21, in a trained state, receives radar data rd2 and outputs the parameters p for digital filter 13 of FIG. 1. Critic network 22 also receives radar data rd2 or any other data indicative of the reflected radar signals and also the parameters set by policy network 21 and outputs a plurality of reward values, also referred to as Q-Values, herein. To this end, critic network 22 includes a plurality of heads h1 to hn, where n is equal to or greater than 2. For example, n may be at or around 10.

In this contribution, head is the terminal part of a network (in this case, the critic network), which is purposed to output a value.

A head, as used herein, outputs a value which is independent from other given heads, coming from the same network. As will be explained later, different heads may be trained using different training data. For example, the different heads may include completely separate neural networks, together forming critic network 22, or may for example have common input layers and/or intermediate layers, but different output layers and/or other intermediate layers, i.e. may have some common layers, but additionally comprise different layers. Training of the critic network 22 will also be explained later in greater detail.

As the heads h1 to hn were trained differently, e.g. using different training data, they yield different reward values. In case the scene to be processed, as represented by radar data rd2, is within the trained range, however, the reward values output by heads h1 to hn will be comparatively close to each other, i.e. have a narrow distribution. If, however, the scene 10 to be processed is rather outside of a trained range of the network, the distribution will be broader. The trained range is e.g. a range of objects (number, type or the like) covered by the training data For instance, training data in a training phase of the machine learning logic of FIG. 2 may include scenes with up to three objects to be tracked by digital filer 13. If a scene to be processed then includes four or five objects, this is outside the trained range, and typically leads to a broader distribution of the reward values provided by heads h1 to hn. The reward value is generated by heads h1 to hn are provided to an out of distribution (OOD) detection 23. Based on the distribution of the reward values, OOD detection 23 detects if the scene 10 to be processed is outside the training range. For example, OOD detection 23 may compare the standard deviation of the distribution of reward values generated by heads h1 to hn with a predefined threshold value, and if the standard deviation exceeds the threshold value, decides on an out of distribution event. In other embodiments, OOD detection 23 may check if one or more values generated by heads h1 to hn are outside an expected distribution width, obtained for example based on training data. This, in turn, indicates that the result td of digital filter 13, which was obtained based on parameters p set by machine learning logic 14, may not be reliable, for example that the tracking result may be erroneous. In other words, the out of distribution event indicates a comparatively high likelihood that information, e.g. tracking information, td output by digital filter 13 is erroneous, for example that the tracking result does not correctly indicate the actual moving objects like persons in scene 10.

Figure 3:
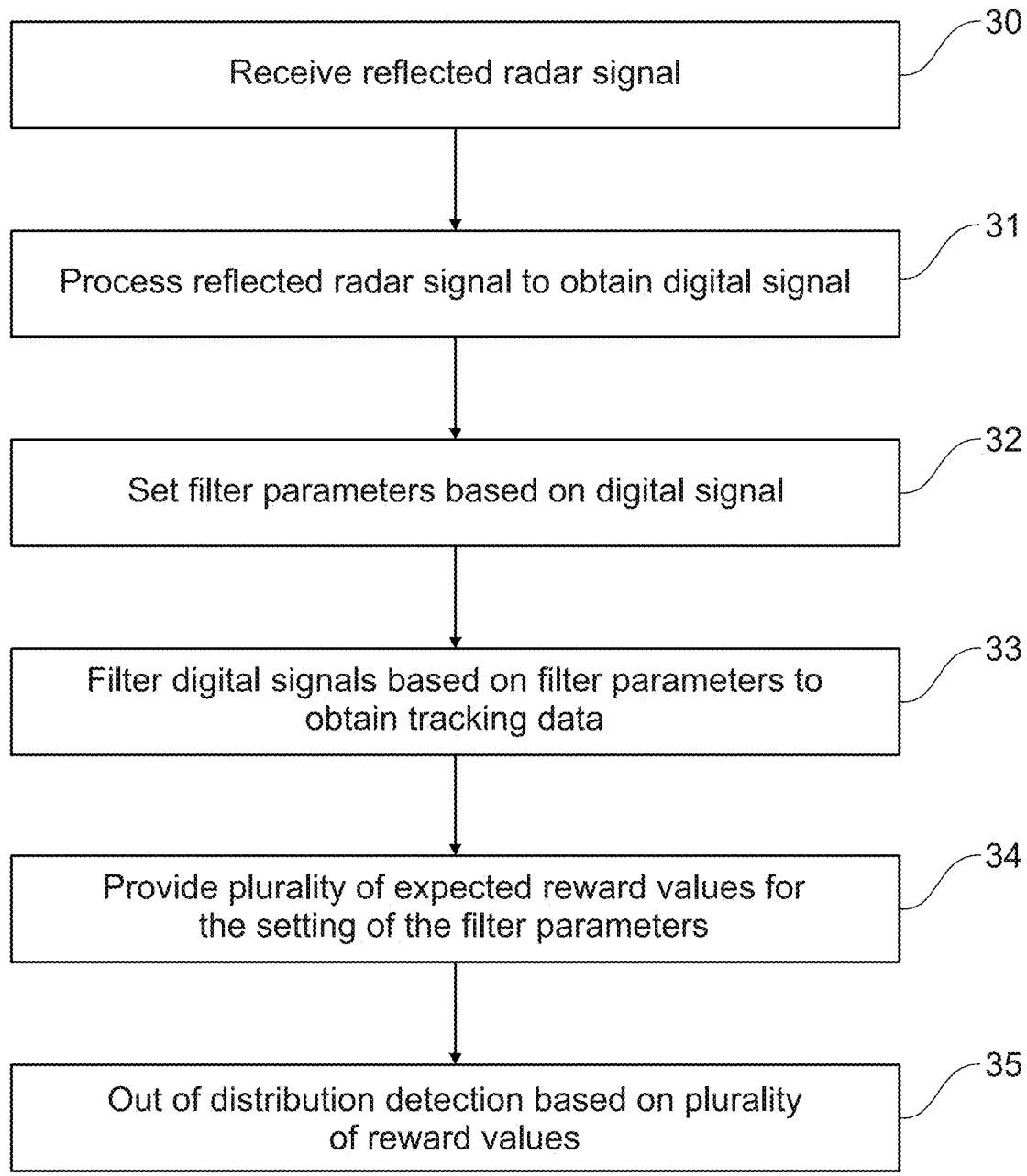
FIG. 3 is a flow chart illustrating a method according to an embodiment.

FIG. 3 is a flow chart illustrating a method according to an embodiment. The method of FIG. 3 may be implemented in the radar device illustrated with reference to FIGS. 1 and 2 or other radar devices, for example radar devices as explained further below. To avoid repetitions, the method of FIG. 3 will be discussed referring to the previous explanations for FIGS. 1 and 2.

At 30 in FIG. 3, the method comprises receiving reflected radar signals from a scene, as explained with reference to FIG. 1.

At 31, the method comprises processing the reflected radar signal to obtain a digital signal, for example by radar front end 11 and processing circuitry 12 of FIG. 1.

At 32, the method comprises setting a filter parameter of a digital filter based on the digital signal, as explained for digital filter 13 in FIG. 1, using a machine learning logic like machine learning logic 14, for example implemented as explained with respect to FIG. 2.

At 33, the method comprises filtering the digital signal based on the filter parameters to obtain information about objects, for example tracking data, as explained for digital filter 13 of FIG. 1.

At 34, the method comprises providing a plurality of reward values for the setting of the filter parameters, for example by heads h1 to hn of FIG. 2.

At 35, the method comprises an out of distribution detection based on the plurality of reward values, for based on a distribution of the reward values as explained above.

Example implementation details of the device of FIG. 1, in particular radar front end 11, processing circuitry 12 and digital filter 13, will now be explained referring to FIGS. 4 to 6. However, it is to be noted that this is merely an example implementation, and other conventional implementations may also be used.

As mentioned above, a radar, such as a millimeter-wave radar, may be used to detect and track humans. For example, FIG. 4 shows a schematic diagram of millimeter-wave radar device 100, according to an embodiment of the present invention. Millimeter-wave radar device 100 includes millimeter-wave radar sensor 102 and processing system 104.

During normal operation, millimeter-wave radar sensor 102 operates as a frequency-modulated continuous-wave (FMCW) radar sensor and transmits a plurality of TX radar signals 106, such as chirps, towards scene 120 using transmitter (TX) antenna 114. The radar signals 106 are generated using RF and analog circuits 130. The radar signals 106 may be in the 20 GHz to 122 GHz range. The objects in scene 120 may include one or more humans, which may be moving or idle, for example. Other objects may also be present in scene 120, other moving or static objects, such as furniture, machinery, mechanical structures, walls, etc.

The radar signals 106 are reflected by objects in scene 120. The reflected radar signals 108, which are also referred to as the echo signal, are received by receiver (RX) antennas 116a and 116b. RF and analog circuits 130 processes the received reflected radar signals 108 using, e.g., band-pass filters (BPFs), low-pass filters (LPFs), mixers, low-noise amplifier (LNA), and/or intermediate frequency (IF) amplifiers in ways known in the art to generate an analog signal xouta(t) and xoutb(t), which are examples for signal ra of FIG. 1.

The analog signals xouta(t) and xoutb(t) are converted to raw digital data xout_dig(n) using ADC 112. The raw digital data xout_dig(n) is processed by processing system 104 to detect humans and their positions, and to track the detected humans.

Figure 4:
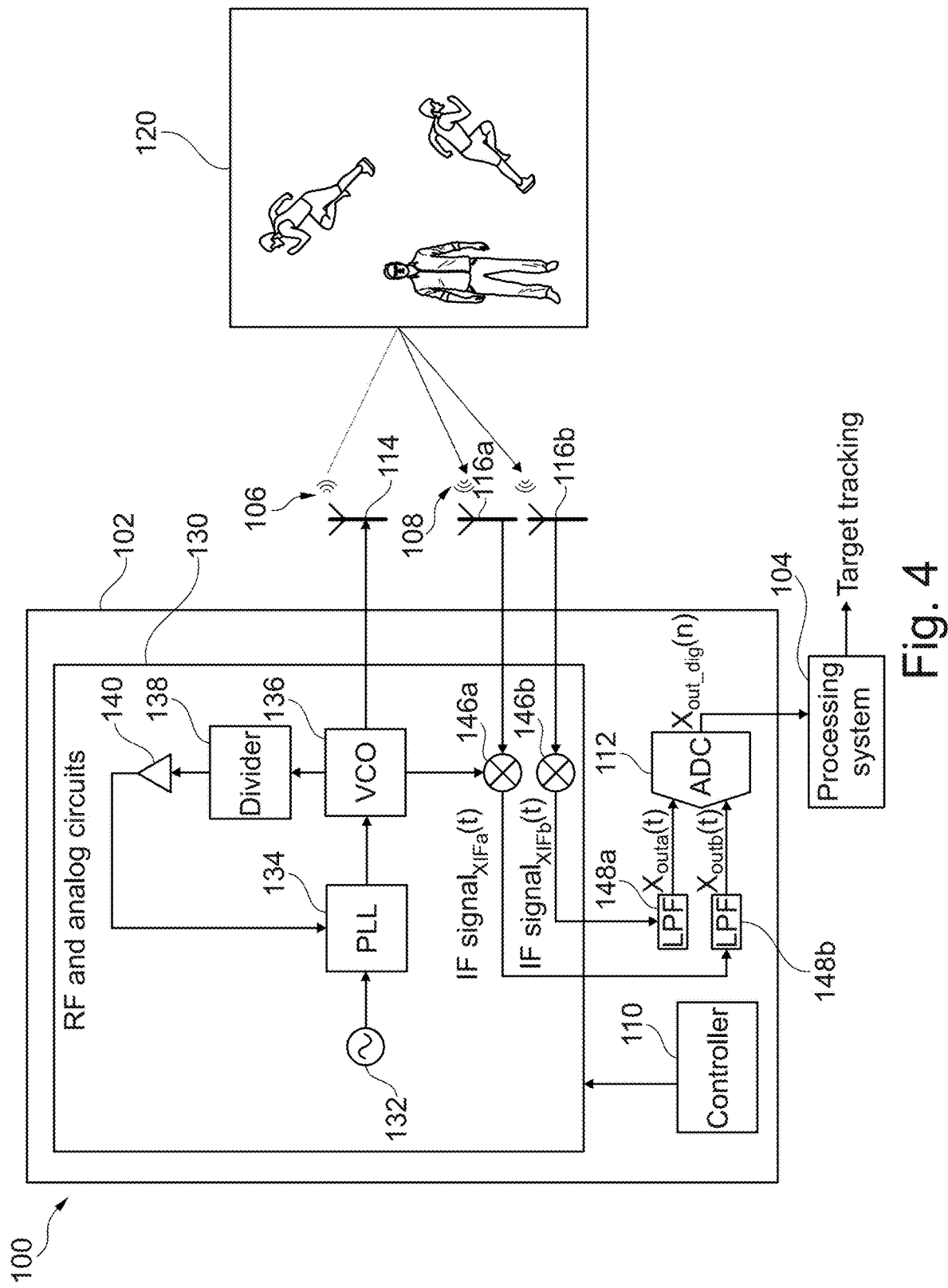
FIG. 4 is a diagram illustrating a radar device according to an embodiment.

Although FIG. 4 illustrates a radar system with a two receiver antennas 116, it is understood that more than two receiver antennas 116, such as three or more, may also be used.

Although FIG. 4 illustrates a radar system with a single transmitter antenna 114, it is understood that more than one transmitter antenna 114, such as two or more, may also be used.

Controller 110 controls one or more circuits of millimeter-wave radar sensor 102, such as RF and analog circuit 130 and/or ADC 112. Controller 110 may be implemented, e.g., as a custom digital or mixed signal circuit, for example. Controller 110 may also be implemented in other ways, such as using a general purpose processor or controller, for example. In some embodiments, processing system 104 implements a portion or all of controller 110.

Processing system 104 may be implemented with a general purpose processor, controller or digital signal processor (DSP) that includes, for example, combinatorial circuits coupled to a memory. In some embodiments, processing system 104 may be implemented as an application specific integrated circuit (ASIC). In some embodiments, processing system 104 may be implemented with an ARM, RISC, or x86 architecture, for example. In some embodiments, processing system 104 may include an artificial intelligence (AI) accelerator. Some embodiments may use a combination of hardware accelerator and software running on a DSP or general purpose microcontroller. Other implementations are also possible.

In some embodiments, millimeter-wave radar sensor 102 and a portion or all of processing system 104 may be implemented inside the same integrated circuit (IC). For example, in some embodiments, millimeter-wave radar sensor 102 and a portion or all of processing system 104 may be implemented in respective semiconductor substrates that are integrated in the same package. In other embodiments, millimeter-wave radar sensor 102 and a portion or all of processing system 104 may be implemented in the same monolithic semiconductor substrate. Other implementations are also possible.

As a non-limiting example, RF and analog circuits 130 may be implemented, e.g., as shown in FIG. 4. During normal operation, VCO 136 generates a radar signal, such as a linear frequency chirp (e.g., from 57 GHz to 64 GHz, or from 76 GHz to 77 GHz), which is transmitted by transmitting antenna 114. The VCO 136 is controlled by PLL 134, which receives a reference clock signal (e.g., 80 MHz) from reference oscillator 132. PLL 134 is controlled by a loop that includes frequency divider 138 and amplifier 140.

The TX radar signal 106 transmitted by transmitting antenna 114 is reflected by objects in scene 120 and received by receiving antennas 116a and 116b. The echo received by receiving antennas 116a and 116b are mixed with a replica of the signal transmitted by transmitting antenna 114 using mixer 146a and 146b, respectively, to produce respective intermediate frequency (IF) signals xIFa(t) xIFb(t) (also known as beat signals). In some embodiments, the beat signals xIFa(t) xIFb(t) have a bandwidth between 10 kHz and 1 MHz. Beat signals with a bandwidth lower than 10 kHz or higher than 1 MHz is also possible.

Beat signals xIFa(t) xIFb(t) are filtered with respective low-pass filters (LPFs) 148a and 148b and then sampled by ADC 112. ADC 112 is advantageously capable of sampling the filtered beat signals xouta(t) xoutb(t) with a sampling frequency that is much smaller than the frequency of the signal received by receiving antennas 116a and 116b. Using FMCW radars, therefore, advantageously allows for a compact and low cost implementation of ADC 112, in some embodiments.

The raw digital data xout_dig(n), which in some embodiments include the digitized version of the filtered beat signals xouta(t) and xoutb(t), is (e.g., temporarily) stored, e.g., in matrices of Nc×Ns per receiver antenna 116, where Nc is the number of chirps considered in a frame and Ns is the number of transmit samples per chirp, for further processing by processing system 104.

In some embodiments, ADC 112 is a 12-bit ADC with multiple inputs. ADCs with higher resolution, such as 14-bits or higher, or with lower resolution, such as 10-bits, or lower, may also be used. In some embodiments, an ADC per receiver antenna may be used. Other implementations are also possible.

Figure 5:
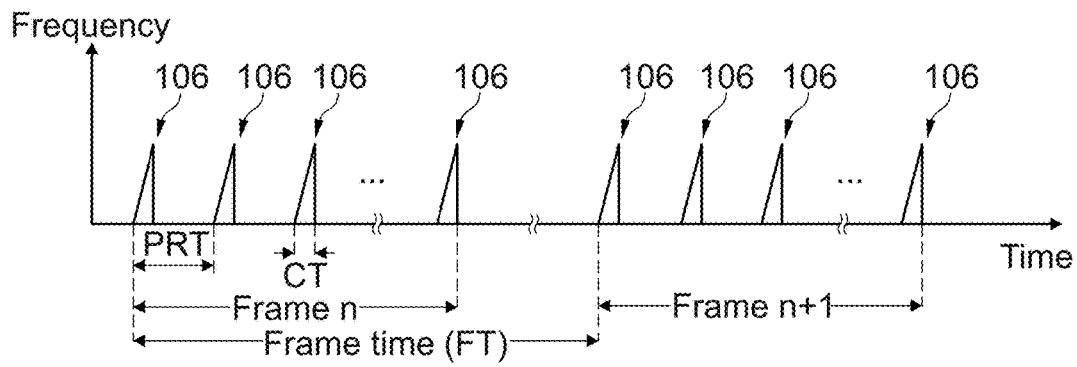
FIG. 5 is a diagram illustrating radar signals useable in embodiments.

FIG. 5 shows a sequence of chirps 106 transmitted by TX antenna 114, according to an embodiment of the present invention. As shown by FIG. 5, chirps 106 are organized in a plurality of frames and may be implemented as up-chirps. Some embodiments may use down-chirps or a combination of up-chirps and down-chirps, such as up-down chirps and down-up chirps. Other waveform shapes may also be used.

As shown in FIG. 5, each frame may include a plurality of chirps 106 (also referred to, generally, as pulses). For example, in some embodiments, the number of pulses in a frame is 16. Some embodiments may include more than 16 pulses per frame, such as 20 pulses, 32 pulses, or more, or less than 16 pulses per frame, such as 10 pulses, 8 pulses, 4 or less. In some embodiments, each frame includes only a single pulse.

Frames are repeated every FT time. In some embodiments, FT time is 50 ms. A different FT time may also be used, such as more than 50 ms, such as 60 ms, 100 ms, 200 ms, or more, or less than 50 ms, such as 45 ms, 40 ms, or less.

In some embodiments, the FT time is selected such that the time between the beginning of the last chirp of frame n and the beginning of the first chirp of frame n+1 is equal to PRT. Other embodiments may use or result in a different timing.

The time between chirps of a frame is generally referred to as pulse repetition time (PRT). In some embodiments, the PRT is 5 ms. A different PRT may also be used, such as less than 5 ms, such as 4 ms, 2 ms, or less, or more than 5 ms, such as 6 ms, or more.

The duration of the chirp (from start to finish) is generally referred to as chirp time (CT). In some embodiments, the chirp time may be, e.g., 64 µs. Higher chirp times, such as 128 µs, or higher, may also be used. Lower chirp times, may also be used.

In some embodiments, the chirp bandwidth may be, e.g., 4 GHz. Higher bandwidth, such as 6 GHz or higher, or lower bandwidth, such as 2 GHz, 1 GHz, or lower, may also be possible.

In some embodiments, the sampling frequency of millimeter-wave radar sensor 102 may be, e.g., 1 MHz. Higher sampling frequencies, such as 2 MHz or higher, or lower sampling frequencies, such as 500 kHz or lower, may also be possible.

In some embodiments, the number of samples used to generate a chirp may be, e.g., 64 samples. A higher number of samples, such as 128 samples, or higher, or a lower number of samples, such as 32 samples or lower, may also be used.

Figure 6:
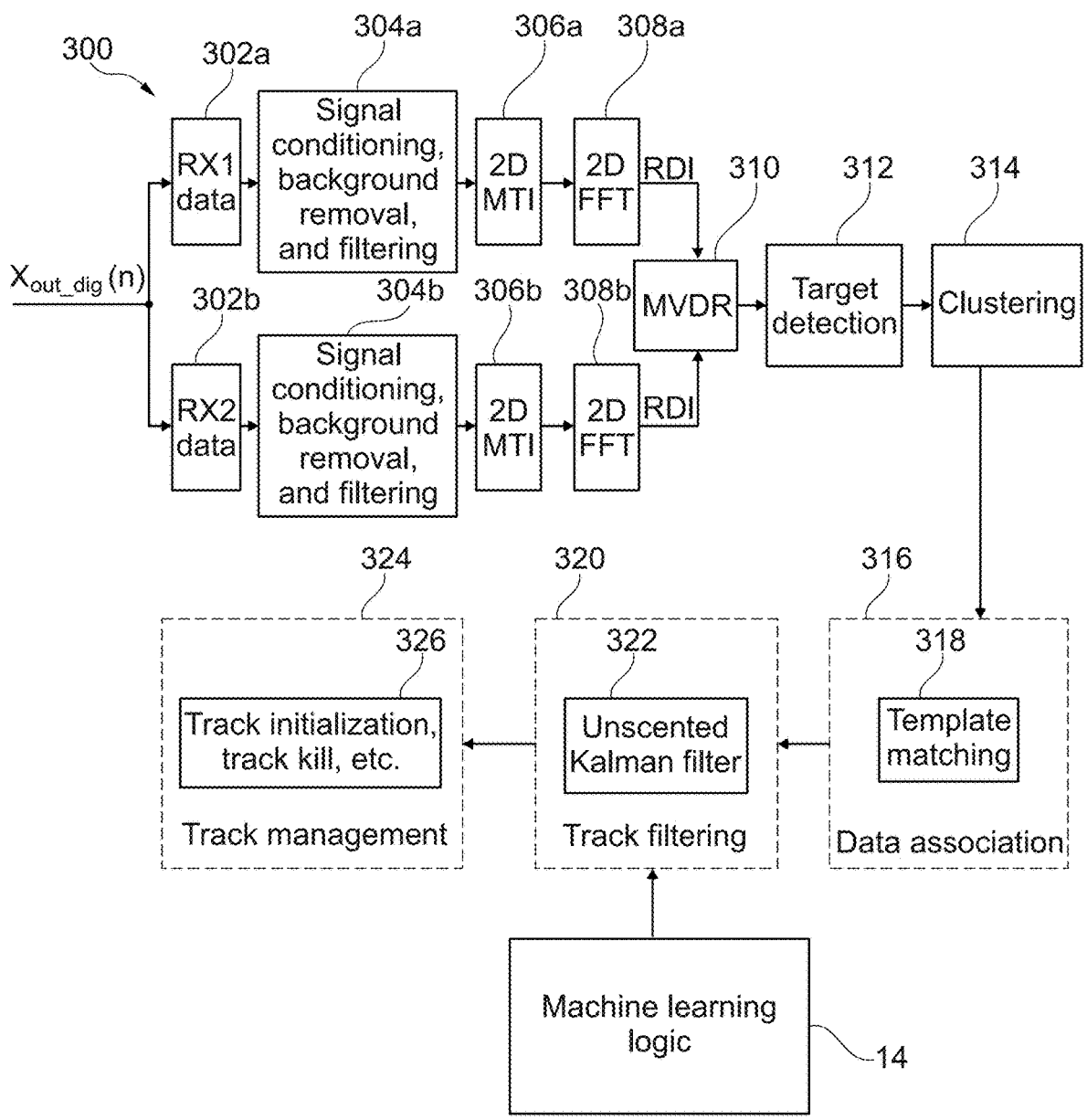
FIG. 6 is a flow chart illustrating operation of processing system 104 of the radar device of FIG. 4.

FIG. 6 shows a flow chart illustrating operation of an embodiment 300 of processing system 104 for people tracking, according to an embodiment of the present invention.

During steps 302a and 302b, raw ADC data xout_dig(n) is received, e.g., from millimeter-wave radar sensor 102. As shown, the raw ADC data xout_dig(n) includes separate baseband radar data from multiple antennas (e.g., 2 in the example shown in FIG. 6).

During steps 304a and 304b, signal conditioning, low pass filtering and background removal are performed on the raw ADC data of the respective antenna 116. The raw ADC data xout_dig(n) radar data are filtered, DC components are removed to, e.g., remove the Tx-Rx self-interference and optionally pre-filtering the interference colored noise. Filtering may include removing data outliers that have significantly different values from other neighboring range-gate measurements. Thus, this filtering also serves to remove background noise from the radar data.

During steps 306a and 306b, 2D moving target indication (MTI) filters are respectively applied to data produced during steps 304a and 304b to remove the response from static targets. The MTI filter may be performed by subtracting the mean along the fast-time (intra-chirp time) to remove the transmitter-receiver leakage that perturbs the first few range bins, followed by subtracting the mean along the slow-time (inter-chirp time) to remove the reflections from static objects (or zero-Doppler targets).

During steps 308a and 308b, a series of FFTs are performed on the filtered radar data produced during steps 306a and 306b, respectively. A first windowed FFT having a length of the chirp is calculated along each waveform for each of a predetermined number of chirps in a frame of data. The FFTs of each waveform of chirps may be referred to as a "range FFT." A second FFT is calculated across each range bin over a number of consecutive periods to extract Doppler information. After performing each 2D FFT during steps 308a and 308b, range-Doppler images are produced, respectively.

During step 310, a minimum variance distortionless response (MVDR) technique, also known as Capon, is used to determine angle of arrival based on the range and Doppler data from the different antennas. A range-angle image (RAI) is generated during step 310. In some embodiments, a range-Doppler-angle data cube is generated during step 310.

During step 312, an ordered statistics (OS) Constant False Alarm Rate (OS-CFAR) detector is used to detect targets. The CFAR detector generates a detection image in which, e.g., "ones" represent targets and "zeros" represent non-targets based, e.g., on the power levels of the RAI, by comparing the power levels of the RAI with a threshold, points above the threshold being labeled as targets ("ones") while points below the threshold are labeled as non-targets ("zeros").

In some embodiments, targets present in the detection image generated during step 312 are clustered during step 314, e.g., based on similar feature characteristics, such as empirical mode decomposition (EMD), and/or scale invariant feature transform (SIFT), associated with the detected targets. In some embodiments, other types of features of the detected targets, such as motion model-based features based on, e.g., range, Doppler, and/or angle, may also be used to cluster cells together. In some embodiments, metrics such as correlation and/or Wasserstein distance may be used to determine the similarities between clusters. In some embodiments, the feature-based clustering is performed by using k-means clustering, in which targets are grouped (clustered) based on having similar features to the one of k clusters having the nearest mean of such (e.g., combined) features.

For example, in some embodiments, a vector of features includes a plurality of features (e.g., intrinsic mode functions (IMFs) and/or number of IMFs, which are associated with EMD, and/or magnitude M(m,n) and/or phase φ(m,n), which are associated with SIFT), where each channel describes a type of feature (e.g., IMFs, number of IMFs, magnitude M(m,n) and/or phase 99 (m,n)). Each channel may be described as a Gaussian distribution (taking mean and variance over available vectors of the same feature). A weighted sum over all the different Gaussian distributions over the channels is obtained to provide a descriptor for each cell, where the descriptor is associated with all the feature types and which may be a value or vector that is indicative of the characteristics (features) of the associated cluster and which may be used to determine how similar are clusters. Such descriptor is used for clustering, e.g., using the k-means clustering algorithm.

In some embodiment, a density-based spatial clustering of applications with noise (DBSCAN) algorithm may also be used to associate targets to clusters during step 314. The output of DBSCAN is a grouping of the detected points into particular targets. DBSCAN is a popular unsupervised algorithm, which uses minimum points and minimum distance criteria to cluster targets, and may be implemented in any way known in the art. Other clustering algorithms may also be used.

In some embodiments, thus, clustering results in the radar image (e.g., RAI or rdI) or data cube being divided into groups of cells with similar descriptors. In some embodiments, each cluster corresponds to a (e.g., potential) detected target. Since the spread of features is not necessarily uniform, in some embodiments, each cluster is not necessarily equal. Thus, in some embodiments, the radar image or data cube is divided into clusters of cells, but each cluster of cells is not necessarily of the same size (e.g., does not have the same number of cells/sub-cells).

During step 316, detected (clustered) targets are associated with respective tracks. As will be described in more detail later, in some embodiments, detected targets are associated to respective tracks using feature-based template matching (during step 318). For example, in some embodiments, geometric features are used during step 318 for template matching. A geometric feature may be understood as a feature that is recognizable despite changes in rotation of the target, as well as changes in the range, Doppler velocity, and angle of the centroid of the target. In some embodiments a geometric feature may include a physical geometric feature, such as physical edges of the target (e.g., from the radar image). In some embodiments, additionally or alternatively, a geometric feature may include a metric (e.g., a vector, function, or group of functions) based on the relationship between cells of the raw data (e.g., of the data cube), such as the relationship between range cells, Doppler velocity cells, and/or angle cells. Examples of such metric include functions extracted using functional decomposition of the data cube, gradients of the data cube, and/or statistical properties of the data cube (such as histograms/PDF of the data cube). Examples of geometric features include EMD features and SIFT features.

In some embodiments, geometric features allow for identification of a target without relying on a motion model. In some embodiments, geometric features allow for distinguishing between tracked targets.

In some embodiments, geometric features such as EMD, and/or SIFT, are tracked for each target. For each clustered cell (for each detected target) a feature vector is generated for each time step i with values of each feature associated with the clustered cell. Detected targets at time step i+1 are assigned to respective tracks based on the similarities between feature vectors (e.g., based on the error between the feature vectors), e.g., using Hungarian assignment. For example, in some embodiments, a similarity measure is identified between feature clusters at consecutive time steps (e.g., i, and i+1), and the assignments that minimize the error (e.g., increase correlation) between feature clusters is selected for track assignment.

In some embodiments, the data association step (316) may include, additionally, data association methods that do not rely on featured-based template matching.

In some embodiments, the data assignment of detected targets (clusters) to tracks relies on the geometric features of the cluster and does not rely (or does not rely solely) on the actual physical locations and/or velocities of the detected targets.

In other embodiments, the data assignment based on geometry may be omitted, and the data assignment may rely on velocity. In yet other embodiments, steps 312 to 316 may be omitted, and Kalman filtering may by directly applied to the output of step 310.

During step 320, track filtering is performed, e.g., for tracking a target over time. For example, in some embodiments, the unscented Kalman filter is used to perform track filtering during step 320. For example, in some embodiments, the features (e.g., SIFT, EMD, range, Doppler, angle, deep learning-based parameters, and/or other parameters associated with the track) are, e.g., additional features used to perform data association (which may also be tracked by the Kalman filter). The unscented Kalman filter may also track localization of each track and may rely on the track history of such localization to enhance data association. The Kalman filter may be implemented in any way known in the art. In other embodiments, an extended Kalman filter may be used.

It is understood that although targets may be identified using template matching (during step 316) that may not include spatial and/or movement information (e.g., range, Doppler, angle), such localization information may still be tracked during step 320. Thus, in some embodiments, featured-based template matching (step 318) is an enabler for data association in environments, such as low frame rate, and/or multi-target scenarios, and/or distributed radar implementations in which relying in localization information alone may be difficult.

During step 324, track management tasks, such as generating tracks and killing tracks are performed. For example, during step 324, track initializations, re-initialization, and/or tracks killing may be performed, e.g., based on whether detected targets are no longer in the field-of-view (in scene 120), or re-entered the field of view, for example.

In some embodiments, steps 316, 320, and 324 may be implemented in different order. For example, in some embodiments, track initialization (during step 324) may be performed before performing step 316.

Data association 316 and template matching 318 may also be omitted in other embodiments.

The parameters of unscented Kalman filter 322 are set by machine learning logic 14 already described referring to FIGS. 1 and 2. This may be based on an output of data association step 316 or any other output in the processing pipeline in particular the one shown in FIG. 6, for example also based on the digital data $x_{out\_dig(n)}$. This in turn means that any of this data may be used as training data (the training process will be described further below).

Next, machine learning logic 14 and training thereof will be described in greater detail.

In some embodiments, during training, the policy network, the critic network, and in some embodiments also one or more value networks are trained using the data coming from the processed scene recorded by the radar, e.g. the radar data rd or rd2 mentioned above. Once there is a convergence in the training process (i.e. no improvement over time), the training is concluded. In inference, i.e. in actual use of the device including the machine learning logic after training, both policy and critic network are used, where the policy network chooses hyperparameters for the digital filter, e.g. tracking filter, and the critic network determines out-of-distribution characteristics of the captured scene as will be explained below in more detail.

In some embodiments the machine learning logic may be based on the so called actor-critic approach, where an actor, for example the policy network of FIG. 2, and a critic network are used. The policy network is trained based on reward values output by the critic network. Simultaneously, the critic network may be trained. In conventional reinforcement learning, in contrast to supervised learning, no specific annotated training data is necessary, but reward values may be generated based a measurable result, for example. In embodiments discussed herein, in contrast to such "pure" reinforcement learning, training data may be annotated, meaning that for example the number of objects to be tracked in a scene and/or their movement is a priori known for the training data, such that the desired result of the tracking is known.

Figure 7:
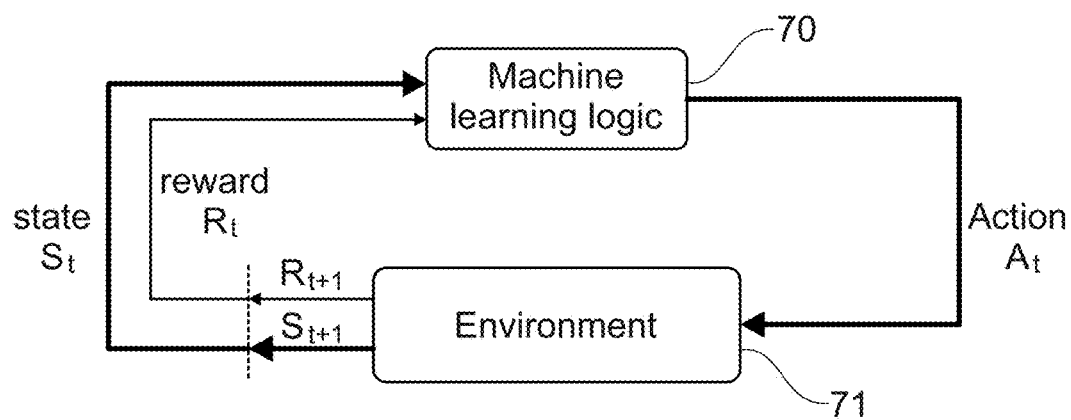
FIG. 7 is a diagram for explaining a machine learning logic according to an embodiment.

FIG. 7 shows a simple scheme of reinforcement learning. A machine learning logic 70 in response to a state of the environment performs an action $A_t$ on the environment 71, which leads to an updated state of the environment $S_{t+1}$ and reward values $R_{t+1}$. The machine learning logic, besides the state $S_t$ acts on the reward value $R_t$. In the present example, this means that generally for a given radar data, the machine learning logic sets certain tracking parameters, which lead to tracked data as to tracked data as a result.

In some implementations, at first the policy network may be trained, then the critic network may be trained, and then a joint training may be performed. Conventional reinforcement learning is able to optimize a scene dependent set of tracking parameters in an environment it has been trained on.

The environment, in this case, indicates circumstances under which a scene is taken, for example presence of other objects, electromagnetic disturbers etc. The scene, however, is a term generally designating the number of objects to be tracked and their movement, in a precise time step. Generally, the tracking performance of conventional approaches like pure actor-critic based approaches is very sensitive on the environment.

Figure 8:
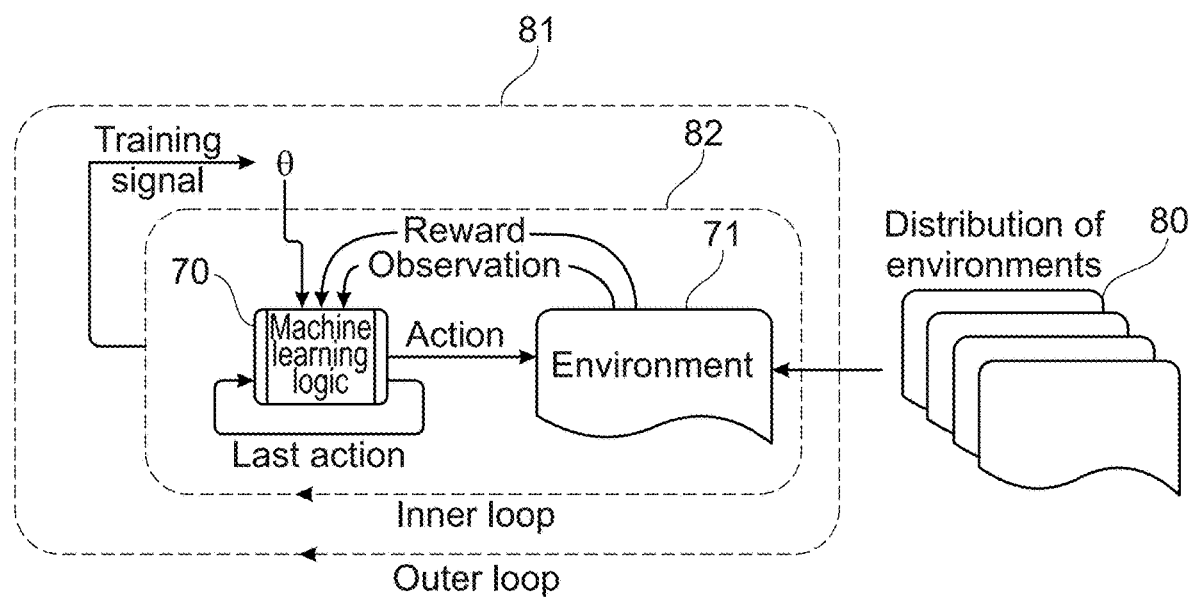
FIG. 8 is a diagram illustrating a machine learning logic according to an embodiment and training thereof.

Therefore, in some embodiments, techniques based on so called meta-reinforcement learning techniques are used, which is a technique essentially to generalize learning. The concept is for example described in Hochreiter, Sepp, A. Steven Younger, and Peter R. Conwell. "Learning to learn using gradient descent." International Conference on Artificial Neural Networks. Springer, Berlin, Heidelberg, 2001. Meta-reinforcement is visualized in FIG. 8. An inner loop 82 corresponds to the reinforcement learning scheme of FIG. 7, where machine learning logic 70, also referred to as agent, receives training signals. An outer loop 81 represents the meta-reinforcement learning. Training is performed based on a distribution of environments, and for example some environments may be used for training the "inner loop", i.e. the reinforcement learning, and other environments may be used for the "outer loop" 81, i.e. the meta-reinforcement learning, which allows a generalization. The meta-reinforcement learning may be performed as off policy meta-reinforcement learning via probabilistic context variables, as described for example in K. Rakelly et al., "Efficient Off-Policy Meta-Reinforcement Learning via Probabilistic Context Variables", arXiv:1903.8254v1, 2019.

This approach in turn is based on the so called soft actor critic approach. Soft actor critic can be thought of as being an actor critic method (essentially a reinforcement learning method) that maximizes the long term reward and the long term entropy.

Figure 9A:
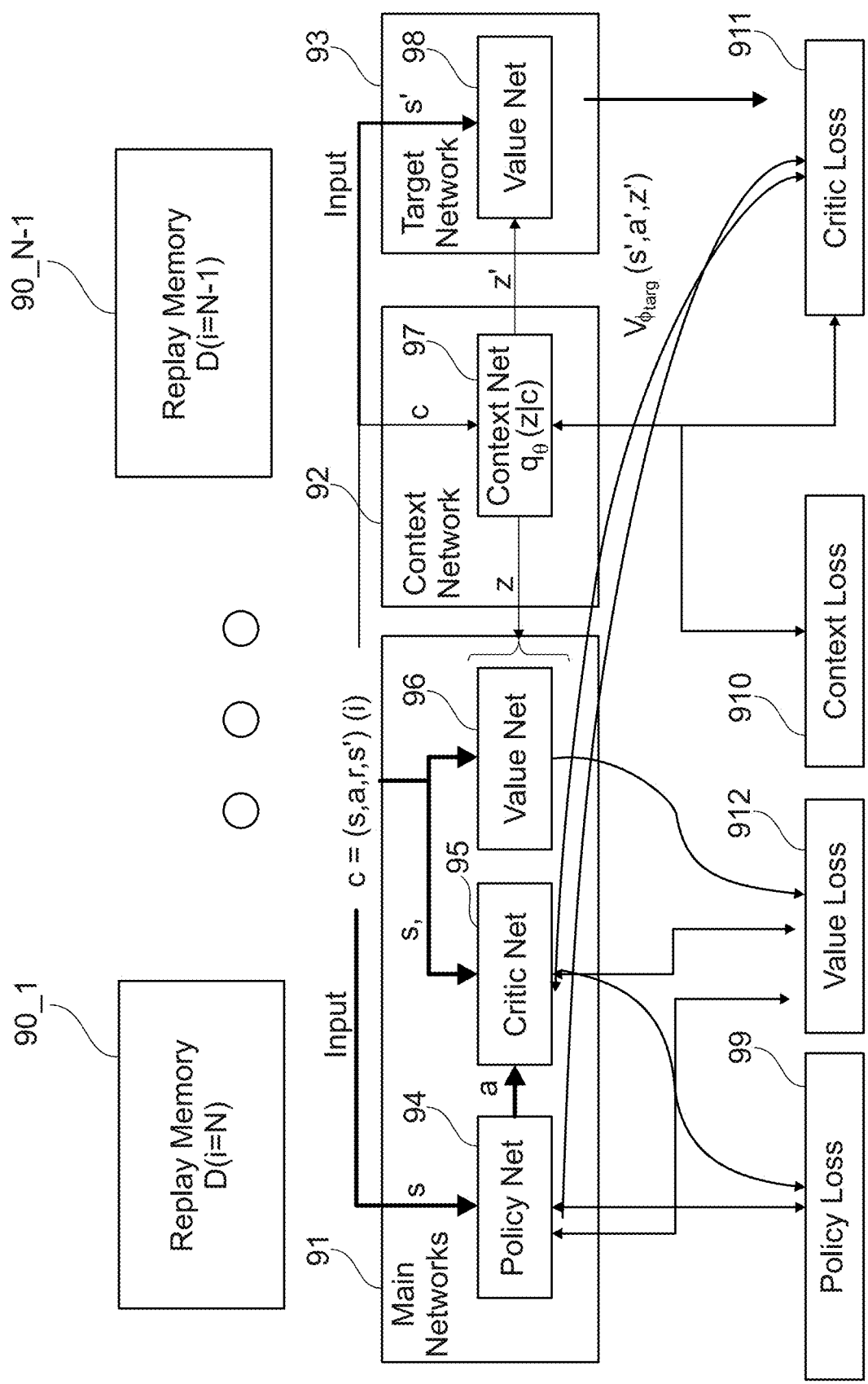
FIGS. 9 A and 9 B illustrate a machine learning logic according to an embodiment and different stages of training thereof.
Figure 9B:
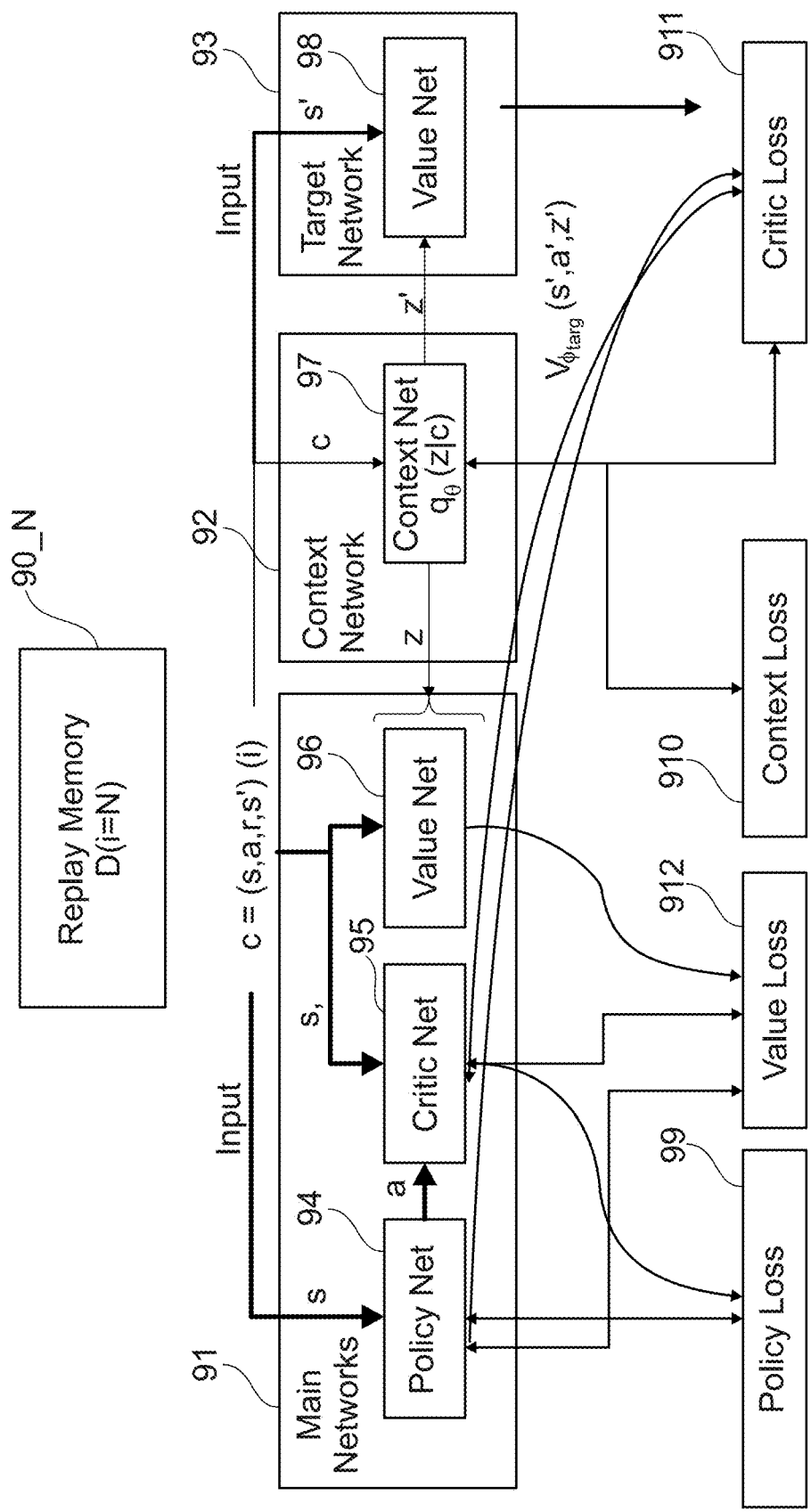

FIGS. 9A and 9B are diagrams illustrating a detailed machine learning logic according to an embodiment, in the embodiment of FIGS. 9A and 9B including a main network group 91, a context network group 92 and a target network group 93. Main network group 91 includes a policy network 94, a critic network 95 and a value network 96. Context network group 92 includes a context network 97. Target network group 93 includes a value network 98, which, to distinguish from value network 96, will be referred to as target value network in the following. Networks 94 to 98 each may be implemented as neural networks including a plurality of layers. Embodiments are not limited to any particular type of layers, and for example fully connected layers, convolutional layers, recurrent layers, etc may be used.

In FIG. 9, "a" represents the action by policy network 94, in the present embodiments the setting of parameters of the digital filter. This is in response to a state "s", i.e. the captured radar signals and/or digital data derived therefrom. "s'" is a next state. "r" denotes the reward value for the action "a" generated by the critic network 95, and additionally by value net 96 or target value net 98. Together, s, a, r, s' from the context c. Training is performed on a plurality of so called tasks, wherein each task consists of a set of states, actions, a transition function and a reward function. The transition function is different for every task, but unknown.

For updating, a policy loss function 99, a context loss function 910, a value loss function 912 and a critic loss function 911 may be used. The updating is then performed corresponding to a gradient of these functions. These loss functions in some embodiments may be defined as follows:

$$L_{policy} = E_{\substack{s \sim B, a \sim \pi, \\ z \sim q_\theta(z|c)}} \left[ D_{KL}\left( \pi(a|s, \bar{z}) \| \frac{\exp(Q_\theta(s, a, \bar{z}))}{Z_\theta(s)} \right) \right]$$

-continued $$L_{critic} = E_{(s,a,r,s')\sim B \atop z\sim q_\theta(z|c)}[Q(s, a, x) - (r + \bar{V}((s', \bar{z})))]^2$$

$$L_{value} = E_{s\sim B}\left[\frac{1}{2}V(s, z) - Q(s, a, z) + \log\pi(a \mid s, z)\right]$$

$$L_{KL} = \beta D_{KL}(q(z \mid c) \parallel r(z))$$

$$L_{Context} = L_{critic} + L_{KL}$$

In the above equations, E is the Expectation operator.

Expectation is always over the subscripted variables of E. E.g. s~B means state s from a sampled Batch B, a~π is the action from the current policy and z~q is the context from the context network. Π generally represents the policy. KL is the KL-Divergence as distance measure, and "exp" is the exponential function.

The policy_loss $L_{policy}$ is the expected KL Divergence between the policy distribution and the exponential Q-Value which is guaranteed to improve the policy. $Z_\theta$ normalizes the distribution and is intractable but does not contribute to gradient computation. $\bar{z}$ means, there is no gradient computation through this variable. Similar for $\bar{V}$. $L_{KL}$ is a constraint loss ensuring that the context variable is not exploding. The use of context variables may be as described in Rakelly et. al, "Efficient Off-Policy Meta-Reinforcement Learning voa Probabilistic Context Variables", arXiv:1903.08254v1, which proposes a standard normal distribution that would result in r(z)=N(0,1), which also has a closed form solution.

The context network 97, based on the context, provides context variables z, z', which are taken into account by value network 96 and target value network 98. For this, the context variable is sampled from the context network. Afterwards, the context variable is an additional input to the policy network and the critic network. Value network 96 and target value network 98 may have the same structure, but target value network 98 may be updated less often, to provide stability.

The training, given the plurality of training tasks, including scenes where the tracked objects are known are as follows:

First, the value network 96 and the target value network 98 with the same network weights. Furthermore, the context variable is initialized for every task as a standard normal distribution.

For each respective task, trajectories executed with the actions "a" of policy network 94 are stored in the replay memory D(i) for that specific task. For every training task for updating/evaluating, the following steps are then performed:

Transitions are randomly sampled from the replay memory;

For the sampled transitions, targets of the temporal difference loss (TD loss) r+yQ(s,a,z) are calculated with the target value network 98, where Q is the reward value generated based on s, a, z;

Critic network 95 is updated using the gradient of the TD loss;

Policy network 94 is updated using the gradient of the policy loss 99;

The value network 96 and/or 98 is updated using critic and policy (actor) entropy.

For this, a soft value function V(s)=Q(a,s)−log(π(s)) may be used, the second term representing the entropy over the action taken by the policy network. The value network is trained to estimate this soft value function by the training described here.

FIG. 9B then shows the situation for the last replay memory, and function V being output by target value net in FIG. 9B, corresponding to the estimated soft value function. FIG. 9B can be seen as representing outer loop 81 of FIG. 8, while FIG. 9A can be seen as representing inner loop 82. While FIGS. 9A and 9B illustrate the training phase, the critic network and in some embodiments also the context network are also used after training, for the out of distribution detection. This will be explained next.

Figure 10:
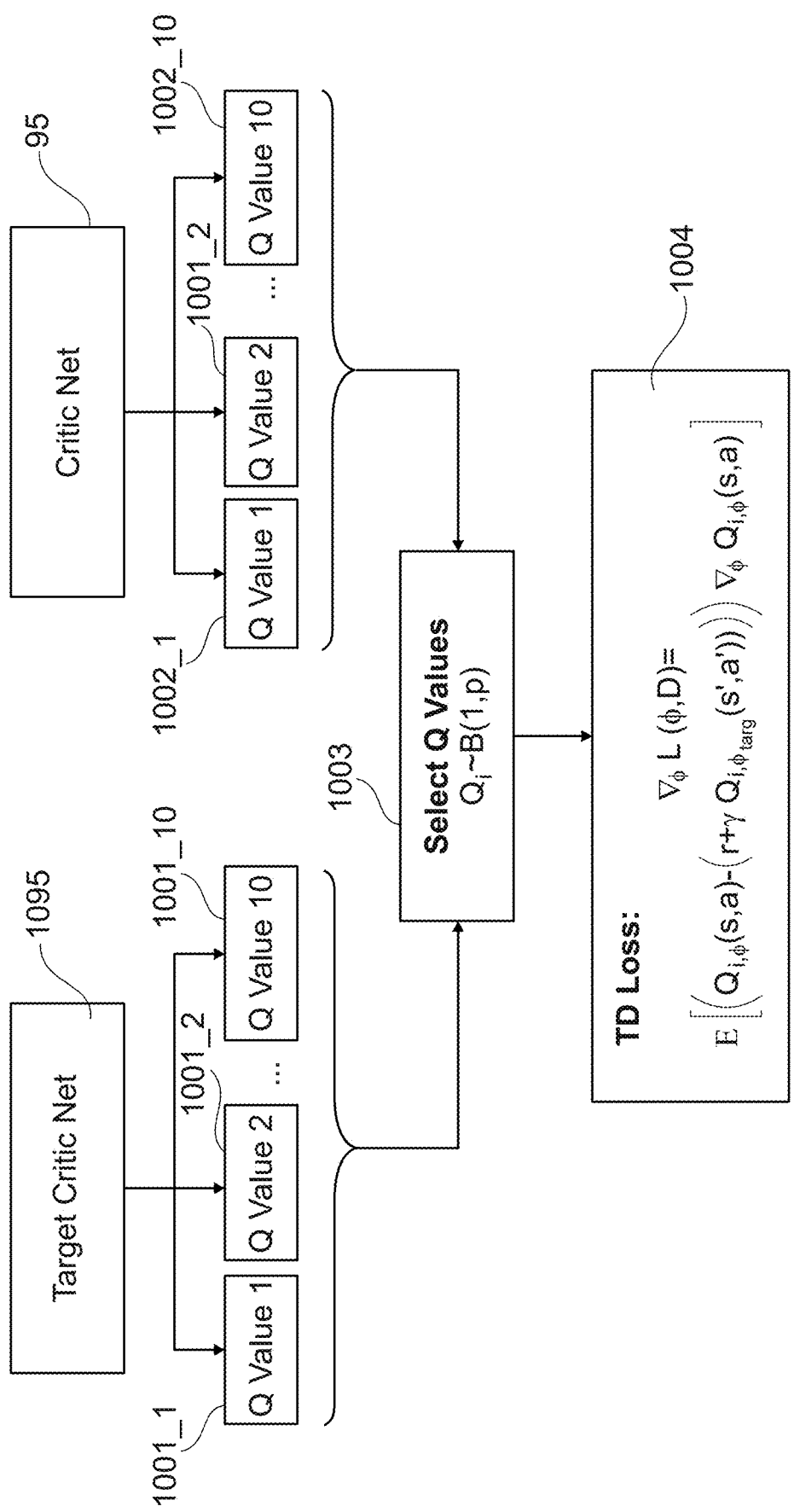
FIG. 10 is a diagram illustrating generation of a plurality of Q-Values used in some embodiments.

FIG. 10 illustrates the out of distribution detection In example of FIG. 10, each of critic network 95 and a target critic network 1095, which may be used for stability purposes during training, similar to target value network 98 of FIG. 9, have a plurality of heads (as explained with reference to FIG. 2 for the critic network), leading to a plurality of respective Q-Values, in the example of FIG. 10 ten Q-Values 1001_1-1001_10 for target value network 98 and ten Q-Values 1002_1-1002_10 for value network 96. Every sampled head learns the same target, but due to the random sampling of replay memories during training explained above, each head sees different data during training, leading to a diversity between the heads. During update and learning, each head at 1003 is sampled with a probability p; Qi~B(1,p). Each head is then updated with the TD loss according to block 1004. The equation shown in block 1004 describes the gradient update for the network, in particular critic Network with respect to multiple heads (see e.g. FIG. 2). Expectation is computed over the training samples in the batch from the replay memory. First term is the predicted Q-Value given the state and action. Second term is the reward minus the predicted future reward from the target critic network for the next state and the current action.

This diversity between the heads can then be used for out of distribution detection later. For example, a mean value p and variance a may be calculated along all heads from the training data, i.e. from the Q-Values resulted in the training phase. A variance scale a may then be defined, for example α=2, and an out of distribution threshold range cr may be defined as cr=μ±ασ.

Whenever one of the heads during normal operation (for example heads h1 to hn of FIG. 2) outputs a Q-Value outside the range of cr, the measurement is classified as out of distribution. Alternatively, as mentioned above the variance of the Q values output may be calculated and compared to a threshold.

Figure 11:
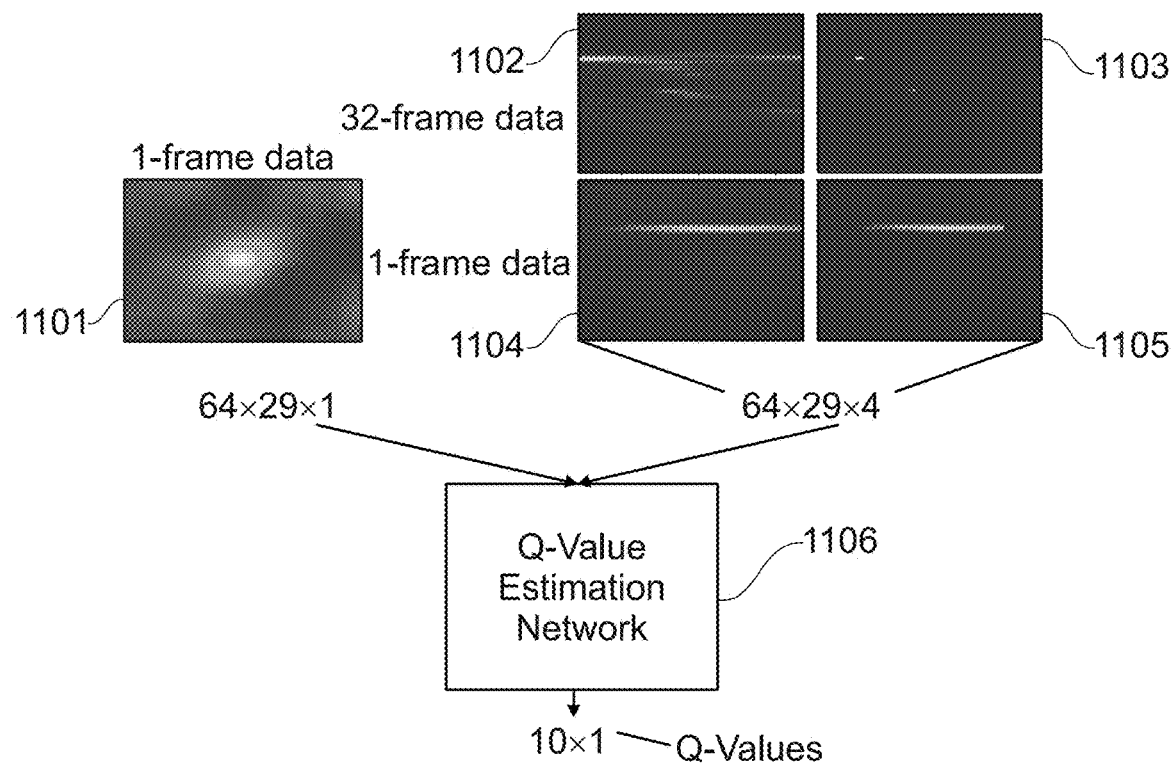
FIG. 11 is a further diagram illustrating generation of a plurality of Q-Values.

FIG. 11 shows this concept applied to radar data. Here, range angle images and range Doppler images 1101 to 1105 from single and from multiple frames are provided as input, and Q-Value estimation network 1106 (for example critic network 22 of FIG. 2, or value network 96 of FIG. 10) outputs respective Q-Values, for example 10 Q-Values, based on which then an out of distribution detection is performed.

Figure 12:
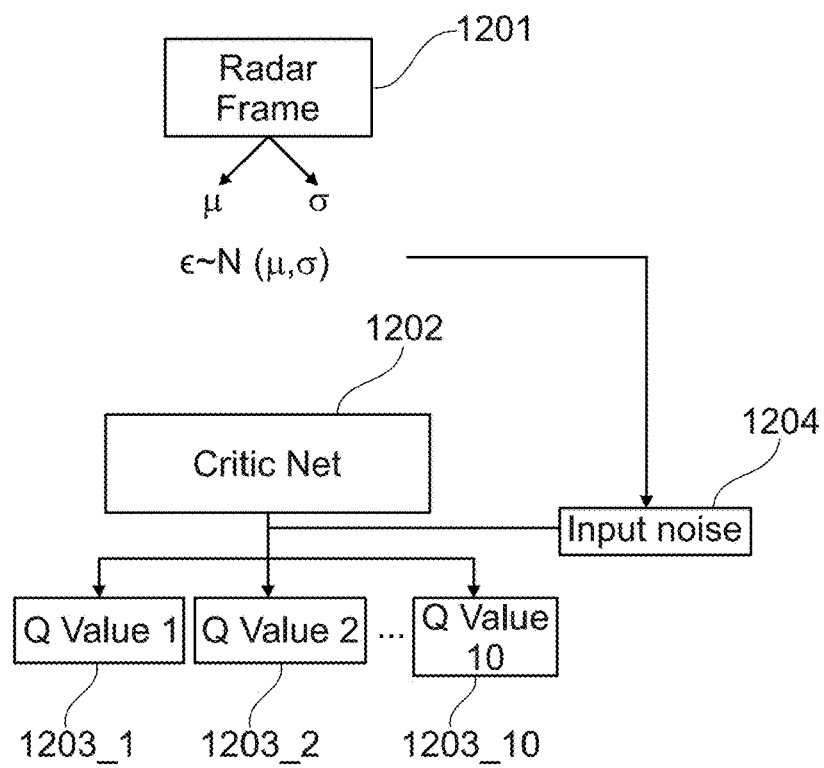
FIG. 12 is a diagram illustrating part of a machine learning logic according to an embodiment.

In some embodiments, for generating the Q-Values additionally input noise may be taken into account. Such an embodiment is illustrated in FIG. 12. A radar frame 1201 can be characterized by a mean value p and a variance a regarding the signal, and a variable ε~N(μ,σ) may be provided which reflects the intensity of the radar signal and the noise. Mean μ and variance σ may be calculated over range angle intensity values of the radar data. This variable is used as input noise 1204 modifying the Q-Values 1203_1 to 1230_10 output by critic network 1202. For example, e may be added as noise in a layer of the critic network, for example in a second last layer before the output. In this case, for example for radar frames including a high number of people, the diversity of the Q-Values generated by the heads is enhanced, which may lead to an improved out of distribution detection.

Figure 13:
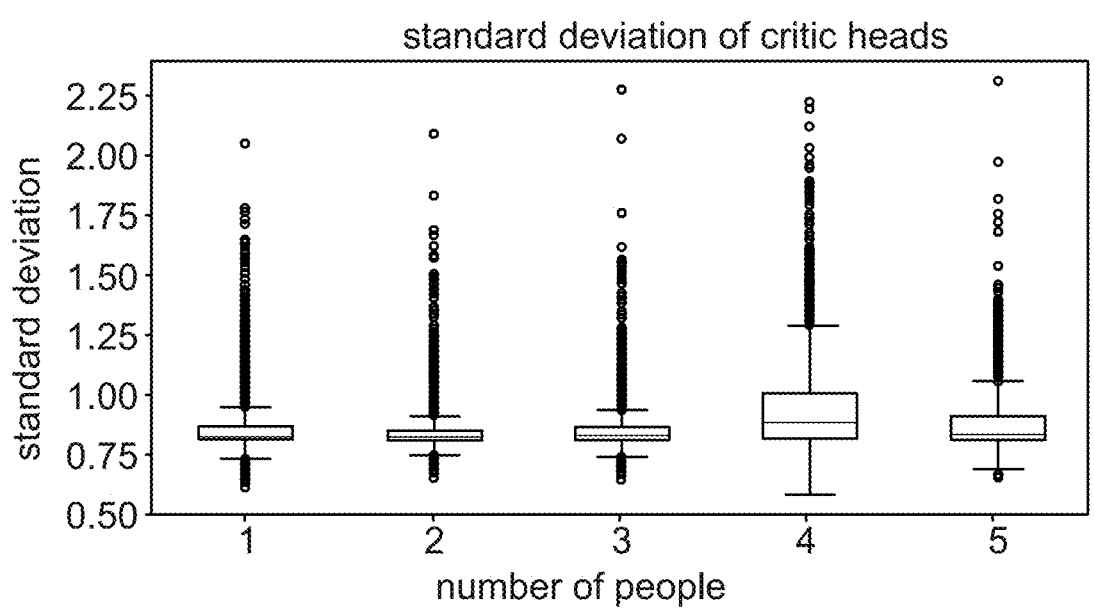
FIG. 13 is an illustrative diagram showing a standard deviation of critic heads over a number of people in the scene.

To illustrate this concept, FIG. 13 illustrates a standard deviation of critic heads over a number of people in the scene. In the example shown, for example the networks have been trained for scenes with up to three people. Due to this, the standard deviation for up to three people is low, but increases significantly when more people, i.e. four or five people, to be tracked are in the scene. As four or five people is outside the range the networks were trained with, the detection and tracking is not as reliable, and this may be detected by the out of distribution detection.

Figure 14:
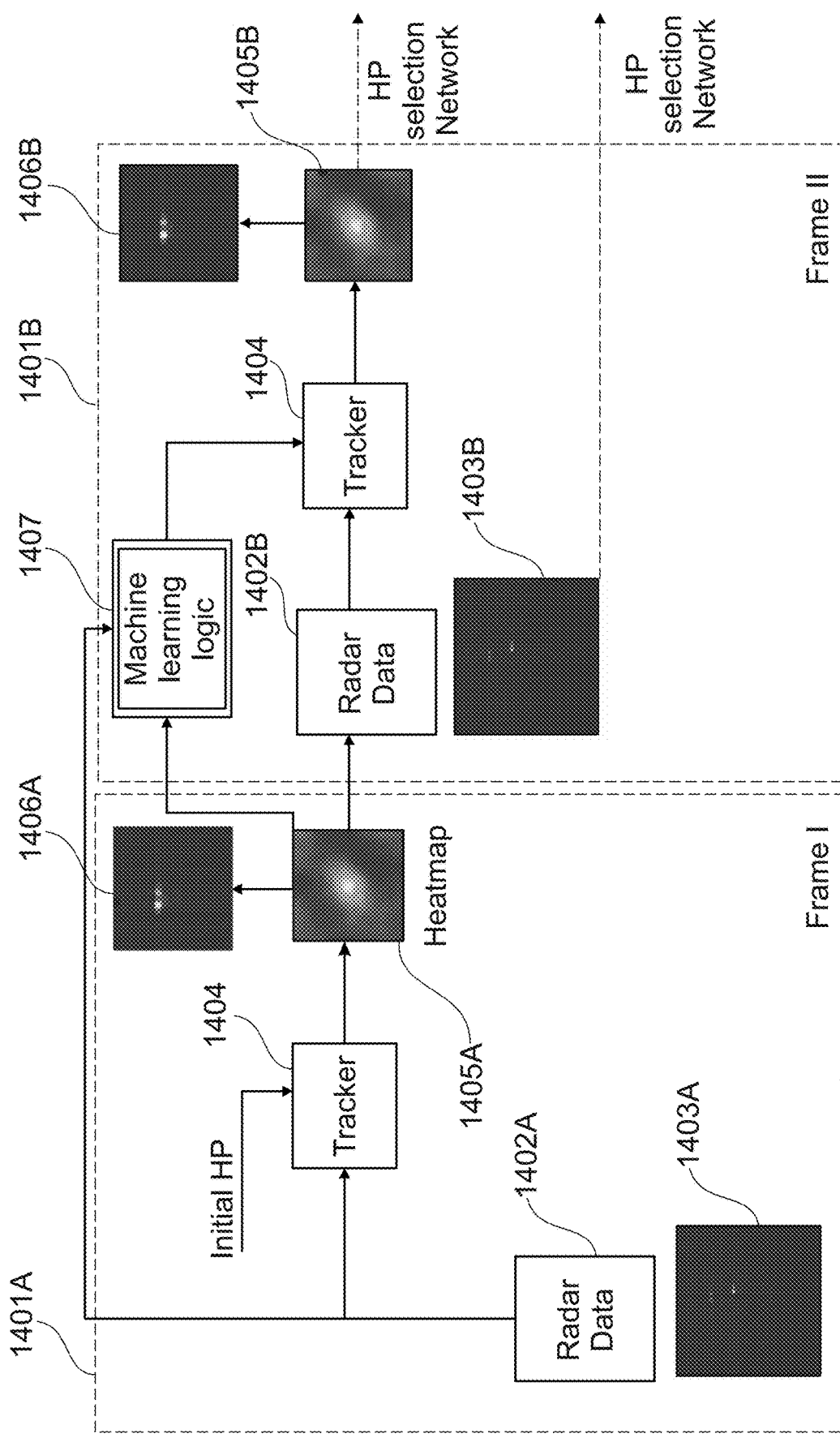
FIG. 14 is an illustrative diagram showing frames in the context of radar tracking parameter optimization according to an embodiment.

FIG. 14 further illustrates the concept discussed herein for radar tracking parameters optimization. The example of FIG. 14 shows two successive frames. In a first frame 1401 radar data 1402A is provided, for example range angle data or range Doppler data as illustrated at 1403A. A tracking filter 1404 filters this data based on initial hyperparameters to provide a heat map 1405A and a predicted target based on the tracking, 1406A. Based on the heat map, a machine learning logic 1407, which may be implemented as discussed above, updates the hyper parameters for tracker 1404. Therefore, next radar data 1402B, for example range angle data or range Doppler data 1403B) is processed by tracker 1404 with the updated parameter, which in turn leads to an updated heat map 1405B and an updated predicted target 1406B, which in turn are provided to machine learning logic 1407 for a next frame.

Some embodiments are defined by the following examples:

Example 1. A radar device, comprising:
a radar front end configured to send radar signals and to receive reflected radar signals,
processing circuitry configured to provide digital radar data based on the received reflected radar signals,
a digital filter configured to process the digital radar data in order to obtain information about objects which reflected the radar signals, and
a machine learning logic, comprising:
a policy network configured to set the parameters of the digital filter based on the digital radar data, and
a reward value generating network including a plurality of heads, each head configured to provide a respective expected reward value for a setting of parameters by the policy network,
wherein the radar device is further configured to detect that a scene captured by the radar device is not reliably processable based on a distribution of the expected reward values generated by the plurality of heads.

Example 2. The radar device of example 1, wherein the radar device is configured to determine that the scene captured by the radar device is not reliably processable based on a comparison of the distribution of the expected reward values with predefined distribution parameters.

Example 3. The radar device of example 1 or 2, wherein the radar device is configured to determine that the scene captured by the radar device is not reliably processable by determining if one of expected reward values lies outside a predefined range about a mean value of the expected reward values.

Example 4. The radar device of any one of examples 1 to 3, wherein the plurality of heads are configured to generate the respective rewards values based on noise of the digital radar data.

Example 5. The radar device of any one of examples 1 to 4, wherein the machine learning logic further comprises a context network configured to generate a context variable based on the radar data, the context variable characterizing a scene captured by the radar device, wherein the reward value generating network is configured to generate the respective reward value based on the context variable.

Example 6. The radar device of any one of examples 1 to 5, wherein the information includes tracking information.

Example 7. The radar device of any one of examples 1 to 6, wherein the digital filter comprises a Kalman filter.

Example 8. The radar device of any one of example 1 to 7, wherein the reward value generating network includes a critic network.

Example 9. A method of operating a radar device, comprising:
transmitting radar signals and receiving reflected radar signals;
providing digital radar data based on the received reflected radar signals;
digitally filtering the digital radar data in order to obtain information about objects which reflected the radar signals;
by a policy network of a machine learning logic, setting parameters of the digitally filtering based on the digital radar data;
by a reward value generating network of the machine learning logic including a plurality of heads, providing a respective expected reward value for each of the plurality of heads for a setting of parameters by the policy network; and
detecting that a scene captured is not reliably processable based on a distribution of the expected reward values generated by the plurality of heads.

Example 10. The method of example 9, wherein determining that the scene captured is not reliably processable comprises comparing the distribution of the expected reward values with predefined distribution parameters.

Example 11. The method of example 9 or 10, wherein determining that the scene captured is not reliably processable comprises determining if one of expected reward values lies outside a predefined range about a mean value of the expected reward values.

Example 12. The method of any one of examples 9 to 11, wherein providing a respective expected reward value for each of the plurality of heads comprises generating the respective rewards values based on noise of the digital radar data.

Example 13. The method of any one of examples 9 to 12, further comprising generating, by a context network of the machine learning logic, a context variable based on the radar data, the context variable characterizing the captured scene, wherein providing a respective expected reward value for each of the plurality of heads comprises generating the respective rewards values based on the context variable.

Example 14. The method of any one of examples 9 to 13, wherein the information includes tracking information.

Example 15. The method of any one of examples 9 to 14, wherein the digitally filtering comprises Kalman filtering.

Example 16. A method of training a machine learning logic of a radar device comprising a radar front end configured to send radar signals and to receive reflected radar signals, processing circuitry configured to provide digital radar data based on the received reflected radar signals, a digital filter configured to process the digital radar data in order to obtain information about objects which reflected the radar signals, and the machine learning logic configured to set parameters of the digital filter based on the received radar signals,
wherein the method comprises:
providing a plurality of training input data sets with associated known information about objects,
training a policy network configured to provide the parameters based on a first subset of the plurality of training input data sets and based on a reward generated by a critic network trained based on the associated known information,
further training the machine learning logic based on a second subset to generalize the training using a meta learning approach.

Example 17. The method of example 16, wherein training the actor network further comprises using a value network to generate a value representing a long term reward, and wherein the training of the policy network is further based on the long term reward.

Example 18. The method of example 17, wherein the further training comprises:
generating a plurality of trajectories based on the second subset and the policy network processing the second subset,
storing the plurality of trajectories in a replay memory, repeatedly:
  randomly sample a transition from the replay memory,
  compute targets of a temporal difference loss using a target value network,
  update the critic network using a gradient of the temporal difference loss,
  update the policy network using a policy gradient, and
  updating the value network based on a policy network entropy.

Example 19. The method of example 18, further comprising clustering the transitions, wherein the training is performed based on the clustering.

Example 20. The method of example 18 or 19, further comprising: for each sampled transition, generate a context variable using a context network, wherein the training is further based on the context variable.

Example 21. The method of any one of examples 18 to 20, wherein the updating is performed based on at least one of a policy loss function, a critic loss function or a context loss function.

Example 22. The method of any one of examples 17 to 21, further comprising:
generate a first plurality of values using the value network based on different ones of the training data sets and a second plurality of values using a target value network based on further different ones of the training data sets, wherein an update rate of the target value network is lower than an update rate of the value network, and
sampling values from the first and second pluralities, and updating the value network and the target value network based on a time difference loss generated based on the sampled values.

Example 23. The method of example 22, further comprising calculating at least one distribution value indicative of a distribution of the first and second plurality of values, wherein the machine learning logic in operation is configured to perform an out of distribution detection based on the at least one distribution value.

Example 24. The method of examples 16 to 23, wherein the training data sets include radar images.

Example 25. The method of any one of examples 16 to 24, wherein the training is performed using training data sets with increasing difficulty.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A radar device, comprising:
a radar front end configured to send radar signals and to receive reflected radar signals;
processing circuitry configured to provide digital radar data based on the received reflected radar signals;
a digital filter configured to process the digital radar data to obtain information about objects which reflected the radar signals; and
a machine learning logic, comprising:
  a policy network configured to set parameters of the digital filter based on the digital radar data,
  a reward value generating network including a plurality of heads, each head configured to provide a respective expected reward value for a setting of the parameters by the policy network, and
  a detector configured to determine whether a scene captured by the radar device is outside of a trained range of the machine learning logic based on a distribution of expected reward values generated by the plurality of heads.

2. The radar device of claim 1, wherein the radar device is configured to determine whether the scene captured by the radar device is outside of the trained range of the machine learning logic based on a comparison of the distribution of the expected reward values with predefined distribution parameters.

3. The radar device of claim 1, wherein the radar device is configured to determine whether the scene captured by the radar device is outside of the trained range of the machine learning logic by determining if one of the expected reward values lies outside a predefined range about a mean value of the expected reward values.

4. The radar device of claim 1, wherein the plurality of heads are configured to generate the respective reward values based on noise of the digital radar data.

5. The radar device of claim 1, wherein the machine learning logic further comprises a context network configured to generate a context variable based on the digital radar data, the context variable characterizing the scene captured by the radar device, wherein the reward value generating network is configured to generate the respective expected reward value based on the context variable.

6. The radar device of claim 1, wherein the information about the objects includes tracking information.

7. The radar device of claim 1, wherein the digital filter comprises a Kalman filter.

8. The radar device of claim 1, wherein the reward value generating network includes a critic network.

9. A method of operating a radar device, comprising:
transmitting radar signals and receiving reflected radar signals;
providing digital radar data based on the received reflected radar signals;
digitally filtering the digital radar data in order to obtain information about objects that reflected the radar signals;
by a policy network of a machine learning logic, setting parameters of the digitally filtering based on the digital radar data;
by a reward value generating network of the machine learning logic including a plurality of heads, providing a respective expected reward value for each of the plurality of heads for a setting of parameters by the policy network; and
determining whether a captured scene from the digital radar data is outside of a trained range of the machine learning logic based on a distribution of the expected reward values generated by the plurality of heads.

10. The method of claim 9, wherein determining whether the scene captured from the digital radar data is outside of the trained range of the machine learning logic comprises comparing the distribution of the expected reward values with predefined distribution parameters.

11. The method of claim 9, wherein determining whether the scene captured from the digital radar data is outside of the trained range of the machine learning logic comprises determining whether one of the expected reward values lies outside a predefined range about a mean value of the expected reward values.

12. The method of claim 9, wherein providing the respective expected reward value for each of the plurality of heads comprises generating the respective reward values based on noise of the digital radar data.

13. The method of claim 9, further comprising generating, by a context network of the machine learning logic, a context variable based on the digital radar data, the context variable characterizing the captured scene, wherein providing the respective expected reward value for each of the plurality of heads comprises generating the respective reward values based on the context variable.

14. The method of claim 9, wherein the information about the objects includes tracking information.

15. The method of claim 9, wherein the digitally filtering comprises Kalman filtering.

16. A radar system, comprising:
a Kalman filter configured to process digital radar data generated by a radar device to obtain information about objects represented by the digital radar data;
a policy neural network configured to set parameters of the Kalman filter based on the digital radar data;
a critic neural network including a plurality of heads, each head configured to provide a respective expected reward value for a setting of the parameters by the policy neural network; and
an out of distribution (OOD) detector configured to determine whether a scene captured by the radar device is outside of a trained range of the policy neural network based on a distribution of expected reward values generated by the plurality of heads.

17. The radar system of claim 16, wherein the OOD detector is configured to determine whether the scene captured by the radar device is outside of the trained range of the policy neural network based on a comparison of the distribution of the expected reward values with predefined distribution parameters.

18. The radar system of claim 16, wherein the OOD detector is configured to determine whether the scene captured by the radar device is outside of the trained range of the policy neural network by determining if one of the expected reward values lies outside a predefined range about a mean value of the expected reward values.

19. The radar system of claim 16, wherein the plurality of heads are configured to generate the respective reward values based on noise of the digital radar data.

20. The radar system of claim 16, wherein the policy neural network and the critic neural network each comprise a convolutional neural network.

* * * * *